(12) United States Patent
Huang et al.

(10) Patent No.: US 10,135,679 B2
(45) Date of Patent: Nov. 20, 2018

(54) NETWORK OFFERING IN CLOUD COMPUTING ENVIRONMENT

(71) Applicant: Citrix Systems, Inc., Fort Lauderdale, FL (US)

(72) Inventors: Alex Huang, Cupertino, CA (US); William Chan, Santa Clara, CA (US); Chiradeep Vittal, Cupertino, CA (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 403 days.

(21) Appl. No.: 14/946,235

(22) Filed: Nov. 19, 2015

(65) Prior Publication Data

US 2016/0080201 A1 Mar. 17, 2016

Related U.S. Application Data

(62) Division of application No. 13/662,483, filed on Oct. 28, 2012, now Pat. No. 9,223,635.

(51) Int. Cl.
*H04L 12/24* (2006.01)
*G06F 9/50* (2006.01)
(Continued)

(52) U.S. Cl.
CPC ...... *H04L 41/0806* (2013.01); *G06F 9/45558* (2013.01); *G06F 9/5005* (2013.01);
(Continued)

(58) Field of Classification Search
None
See application file for complete search history.

(56) References Cited

U.S. PATENT DOCUMENTS

| 8,095,929 B1 | 1/2012 | Ji et al. |
| 8,250,213 B2 * | 8/2012 | Glover .............. H04L 47/781 709/220 |

(Continued)

FOREIGN PATENT DOCUMENTS

| CN | 102292698 A | 12/2011 |
| CN | 102316157 A | 1/2012 |

(Continued)

OTHER PUBLICATIONS

May 30, 2016—(CN) Notice of First Office Action—App 201380068687.6.
(Continued)

*Primary Examiner* — Qing Yuan Wu
(74) *Attorney, Agent, or Firm* — Banner & Witcoff, Ltd.

(57) ABSTRACT

A cloud system may create and support multiple network offerings for virtual machines in a cloud zone. Physical networks comprising sets of network elements, such as routers, gateways, firewalls, load balancers, and other network hardware, may be created and updated within a zone. Network offerings may be defined and associated, using tags or other techniques, with virtual machine networks, physical networks and/or network elements. Cloud end users may request specific network offerings when creating virtual machines, or may request to move existing virtual machines from one network offering to another. The cloud system may use the requested network offering to identify the virtual machine network, physical network, and/or network elements corresponding to the requested network offering. The cloud system may allocate a new virtual machine network and configure the network elements within the associated physical network to provide network services to the virtual machine.

18 Claims, 10 Drawing Sheets

(51) Int. Cl.
*G06F 9/455* (2018.01)
*H04L 29/08* (2006.01)
*H04L 29/12* (2006.01)

(52) U.S. Cl.
CPC .......... *G06F 9/5072* (2013.01); *G06F 9/5077* (2013.01); *H04L 41/5054* (2013.01); *H04L 41/5096* (2013.01); *G06F 2009/45562* (2013.01); *G06F 2009/45595* (2013.01); *H04L 61/2015* (2013.01); *H04L 61/2507* (2013.01); *H04L 67/10* (2013.01)

(56) References Cited

U.S. PATENT DOCUMENTS

| | | | |
|---|---|---|---|
| 8,850,026 B2* | 9/2014 | Glover | H04L 47/781 709/222 |
| 2009/0300635 A1 | 12/2009 | Ferris | |
| 2012/0239792 A1 | 9/2012 | Banerjee et al. | |

FOREIGN PATENT DOCUMENTS

| | | |
|---|---|---|
| EP | 2405386 A2 | 1/2012 |
| WO | 2012/142310 A1 | 10/2012 |

OTHER PUBLICATIONS

International Search Report and Written Opinion dated May 30, 2014 from corresponding PCT/US2013/066918.
Mar. 25, 2015—(US) Non-Final Office action—U.S. Appl. No. 13/662,483.
Jul. 17, 2018—(EP) Summons to Attend Oral Proceedings—App 13788856.6.

* cited by examiner

NETWORK OFFERING IN CLOUD COMPUTING ENVIRONMENT

CROSS-REFERENCE TO RELATED APPLICATIONS

This application claims priority as a divisional application of U.S. patent application Ser. No. 13/662,483, entitled "Network Offering in Cloud Computing Environment," filed Oct. 28, 2012, the entirety of which is incorporated herein by reference.

FIELD

This application generally relates to computers and computer networks, and creating and managing virtual machines. In particular, this application relates to providing network services to virtual machines in a cloud computing environment.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual machines and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources including processing resources (e.g., desktop virtualization servers), storage resources (e.g., storage disks), networking resources (e.g., network hardware elements and physical wiring), and other physical resources that may be used to provision virtual machines. A cloud system also may include the additional computing devices to provide management and customer portals for cloud operators and end users of the cloud system.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

Aspects herein describe systems and methods for identifying network resources and providing network services to virtual machines in a cloud computing environment. According to certain aspects of the disclosure, one or more physical networks may be created within a zone of a cloud computing environment, each physical network comprising a set of network elements. Network elements, such as routers, gateways, firewalls, load balancers, and other network hardware, may be added to and removed from different physical networks within the zone, so that one physical network may be associated with one set of network elements and another physical network may be associated with a different set of network elements. Network offerings may be created and associated, using tags or other techniques, with various physical networks and/or network elements. For example, a network offering corresponding to a set of network services may be associated with a virtual machine network, which may be associated with one of the physical networks within the cloud zone.

According to additional aspects of the disclosure, cloud end users may request specific network offerings when creating virtual machines, or may request to move existing virtual machines from one network offering to another. After receiving such a request, the cloud system may use the requested network offering to identify the virtual machine network, physical network, and/or network elements corresponding to the requested network offering. The cloud system may allocate a new virtual machine network and configure the network elements within the associated physical network to provide network services to the virtual machine. When destroying a virtual machine or moving a virtual machine to a different network, the cloud system may de-allocate the services provided the network elements and/or may de-allocate the virtual machine network associated with the virtual machine, based on the resource management policies of the cloud system.

BRIEF DESCRIPTION OF THE DRAWINGS

Figure 1:
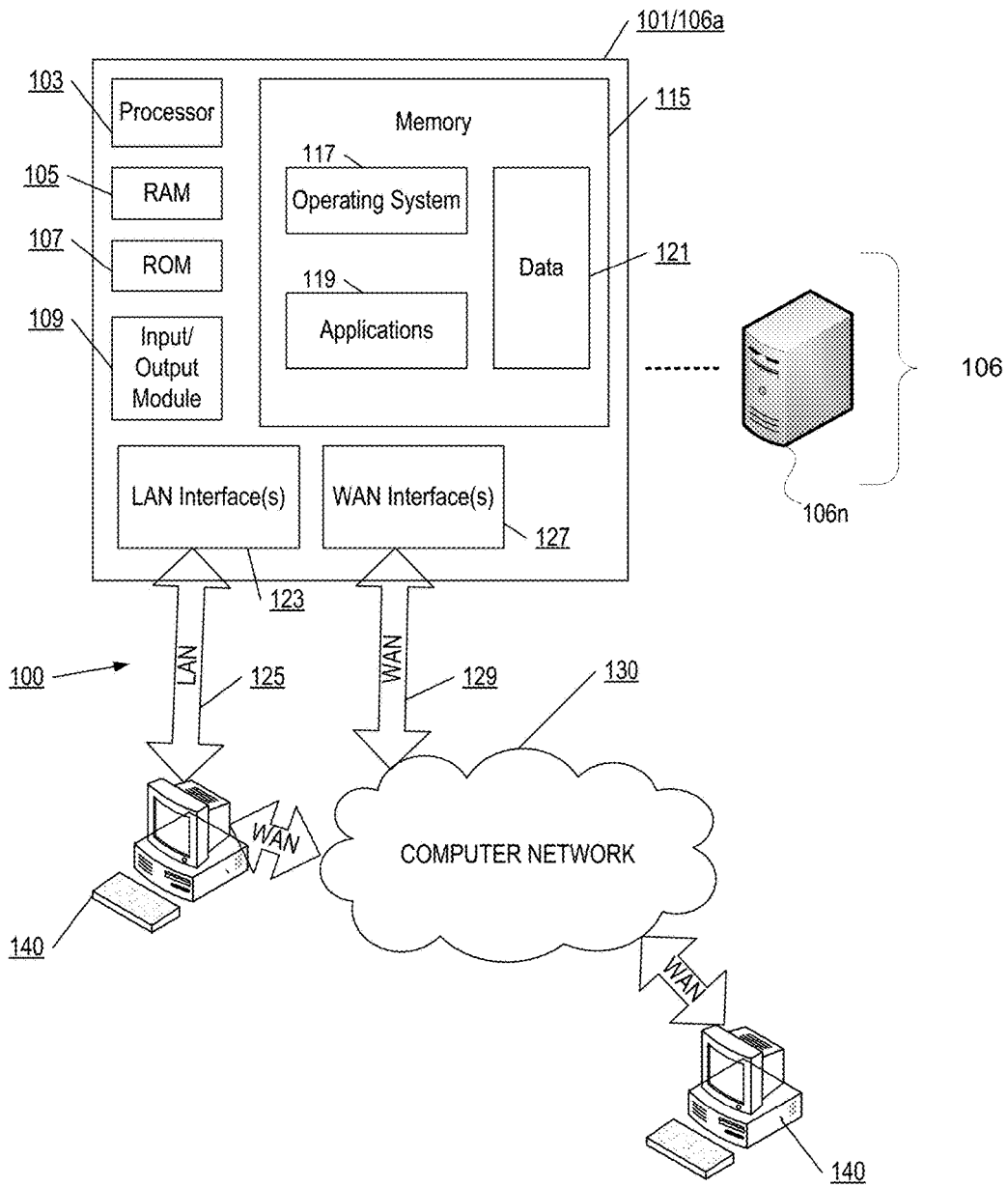

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
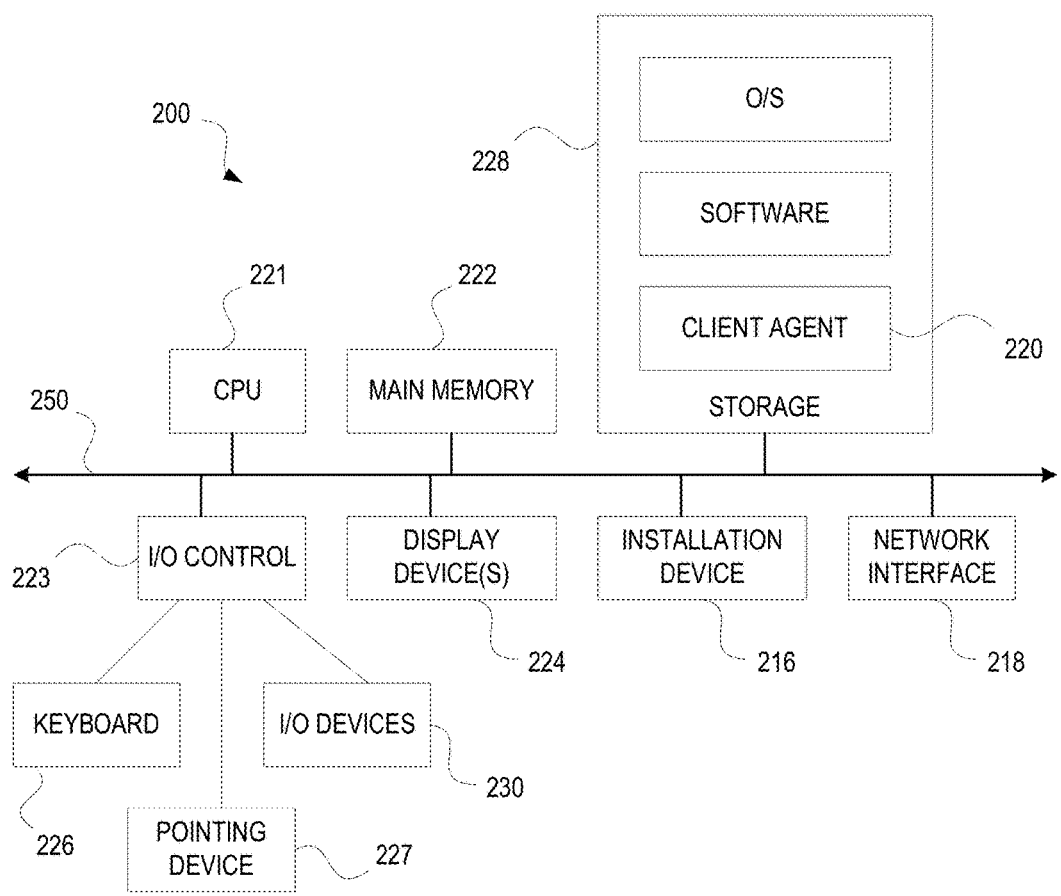

FIG. 2 illustrates a computing device that may be used in accordance with one or more illustrative aspects described herein.

Figure 3:
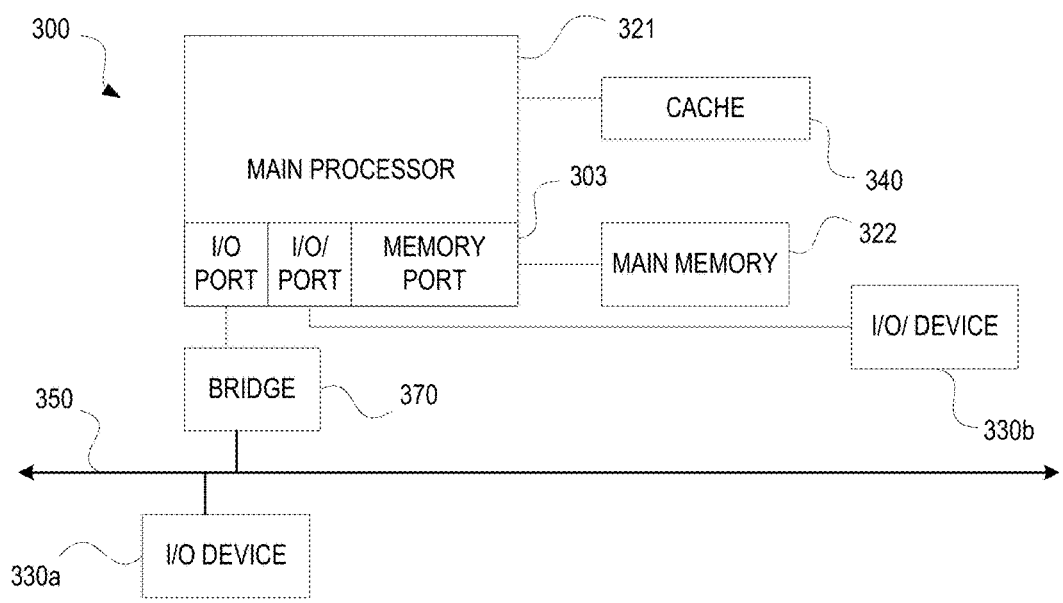

FIG. 3 illustrates a computing device that may be used in accordance with one or more illustrative aspects described herein.

Figure 4:
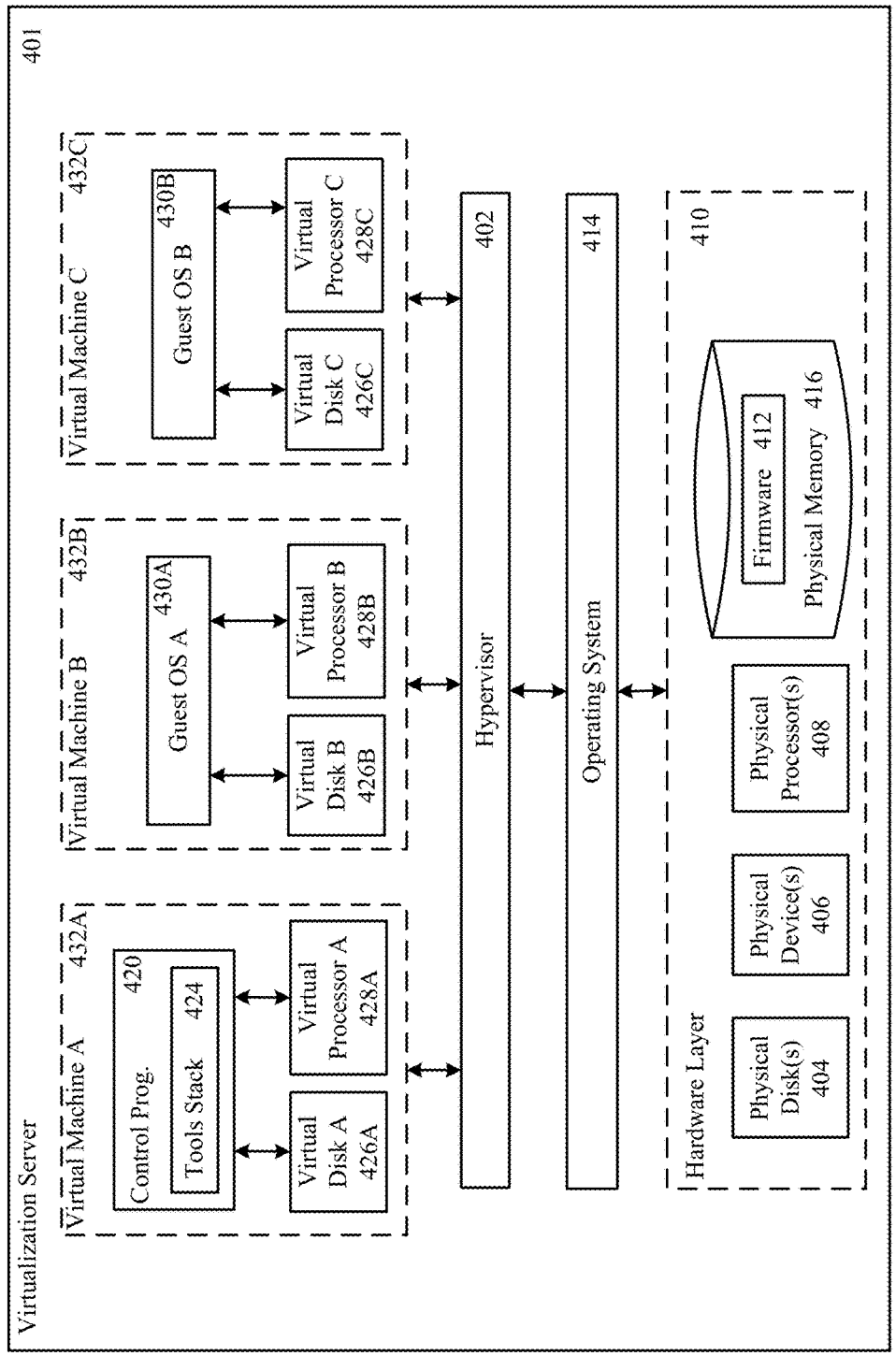

FIG. 4 is a block diagram that depicts embodiments of a virtualization server in accordance with one or more illustrative aspects described herein.

Figure 5:
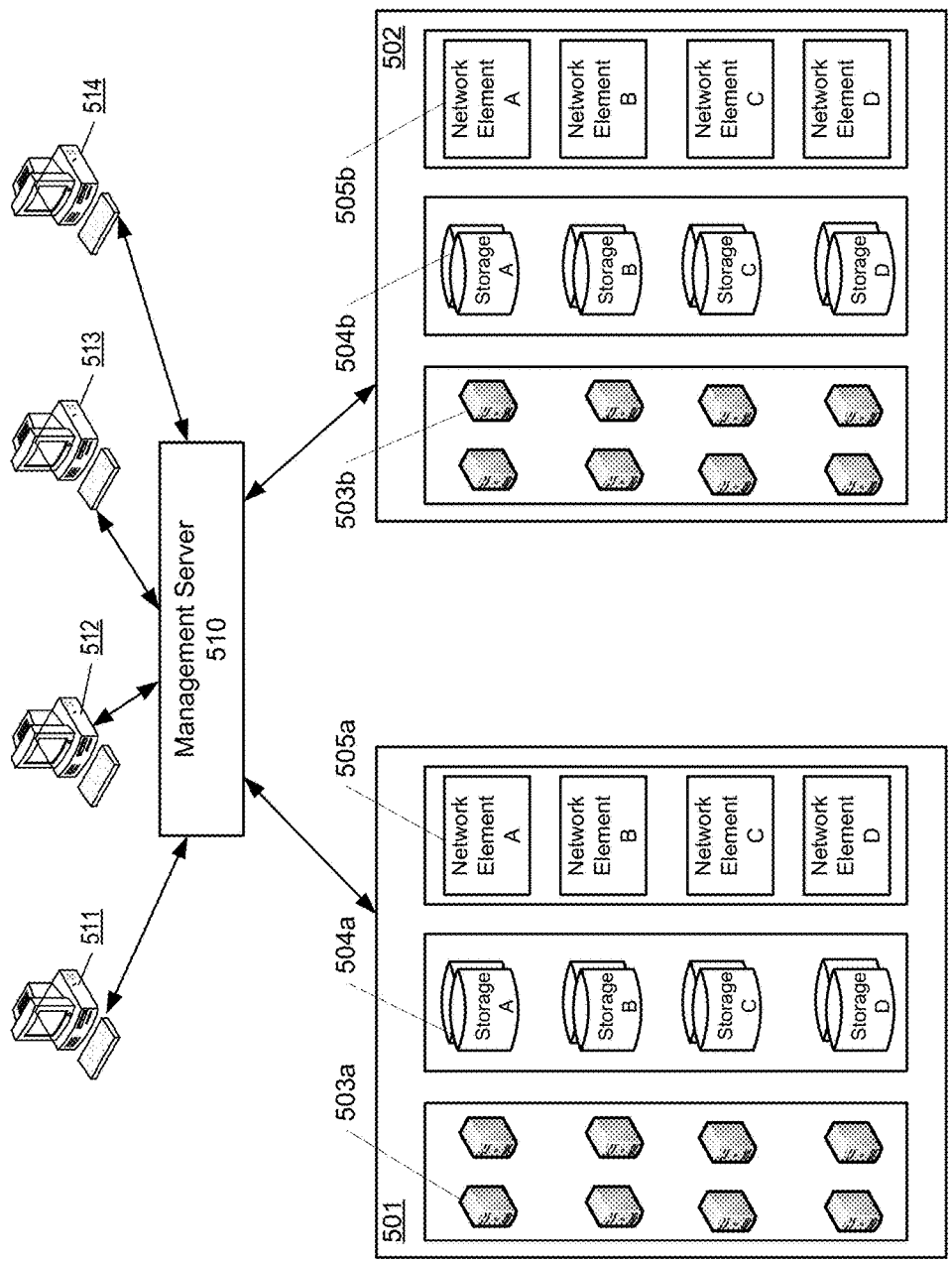

FIG. 5 illustrates a block diagram that depicts embodiments of a cloud computing environment in accordance with one or more illustrative aspects described herein.

Figure 6:
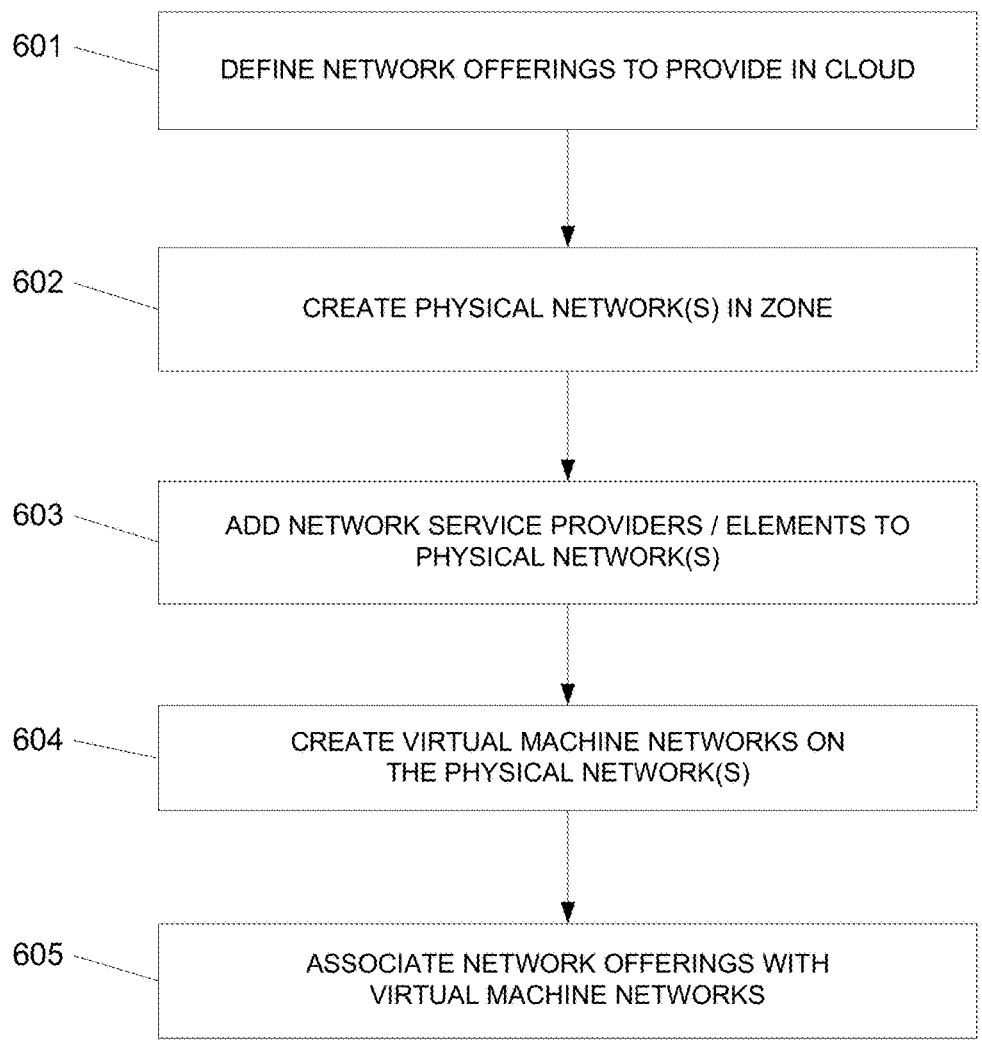

FIG. 6 is a flow diagram illustrating an example process of associating network offerings with virtual machine networks, physical networks, and/or network elements in a cloud computing environment, in accordance with one or more illustrative aspects described herein.

Figure 7:
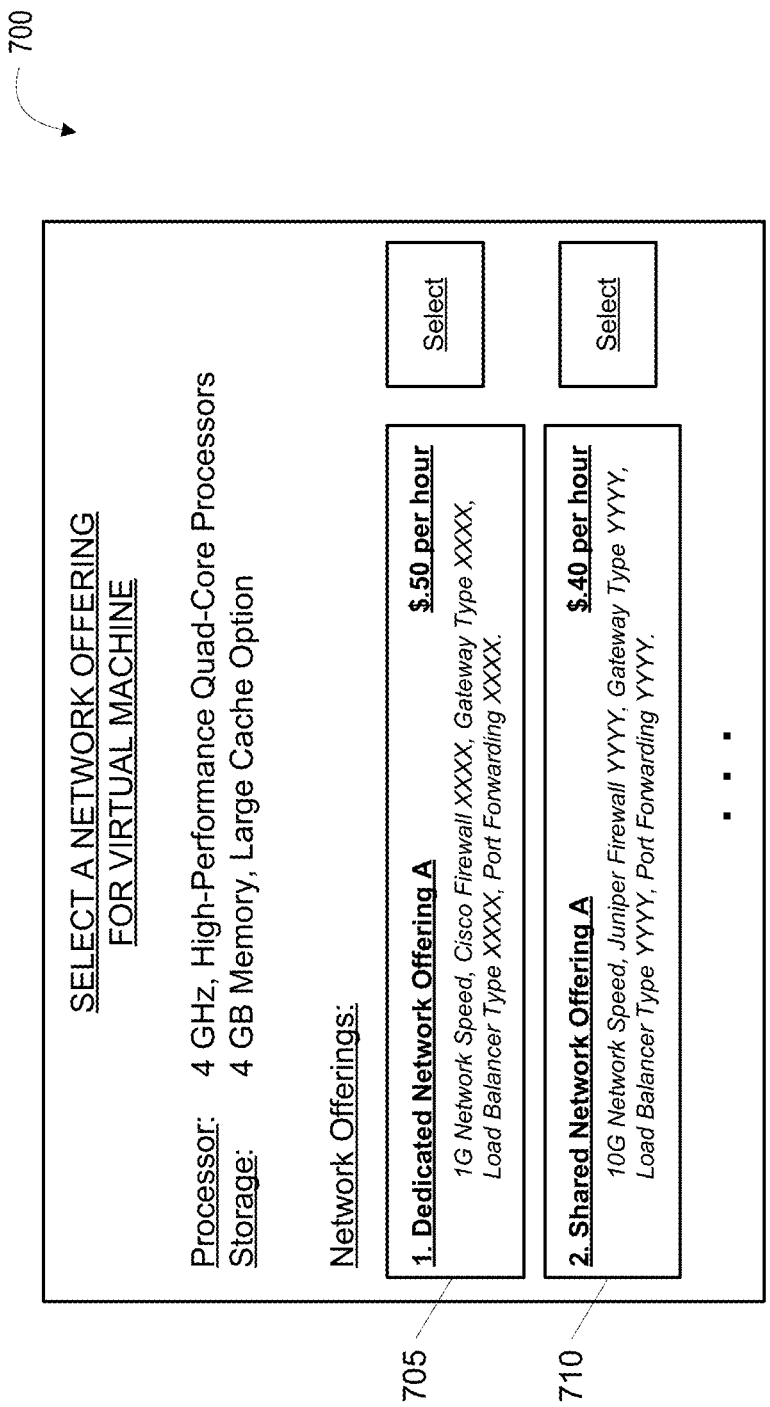

FIG. 7 illustrates an example user interface presenting a set of network offerings for a virtual machine in a cloud computing environment, in accordance with one or more illustrative aspects described herein.

Figure 8:
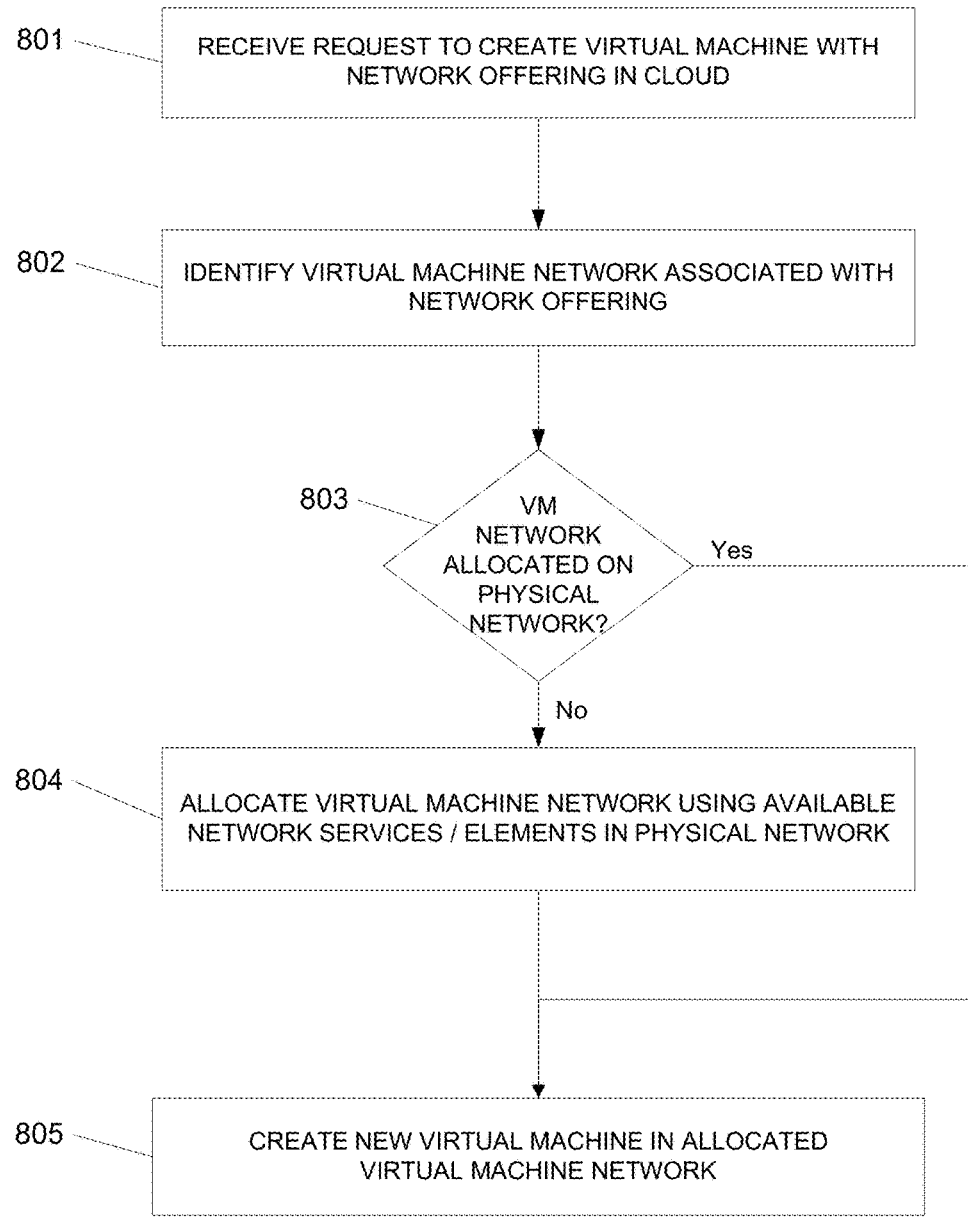

FIG. 8 is a flow diagram illustrating an example process of creating a new virtual machine based on a selected network offering in a cloud computing environment, in accordance with one or more illustrative aspects described herein.

Figure 9:
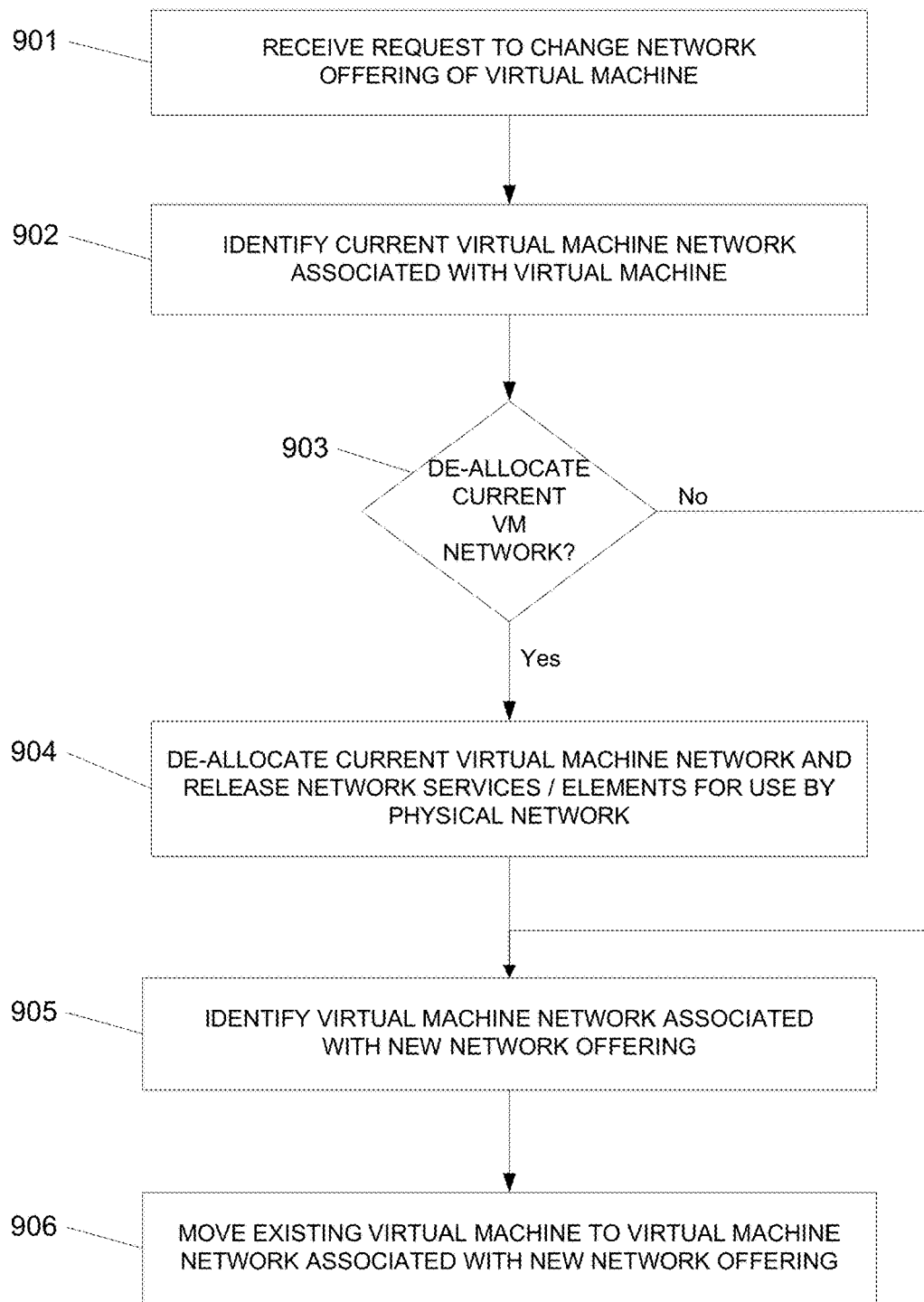

FIG. 9 is a flow diagram illustrating an example process of moving a virtual machine to a different virtual machine network in a cloud computing environment, in accordance with one or more illustrative aspects described herein.

Figure 10:
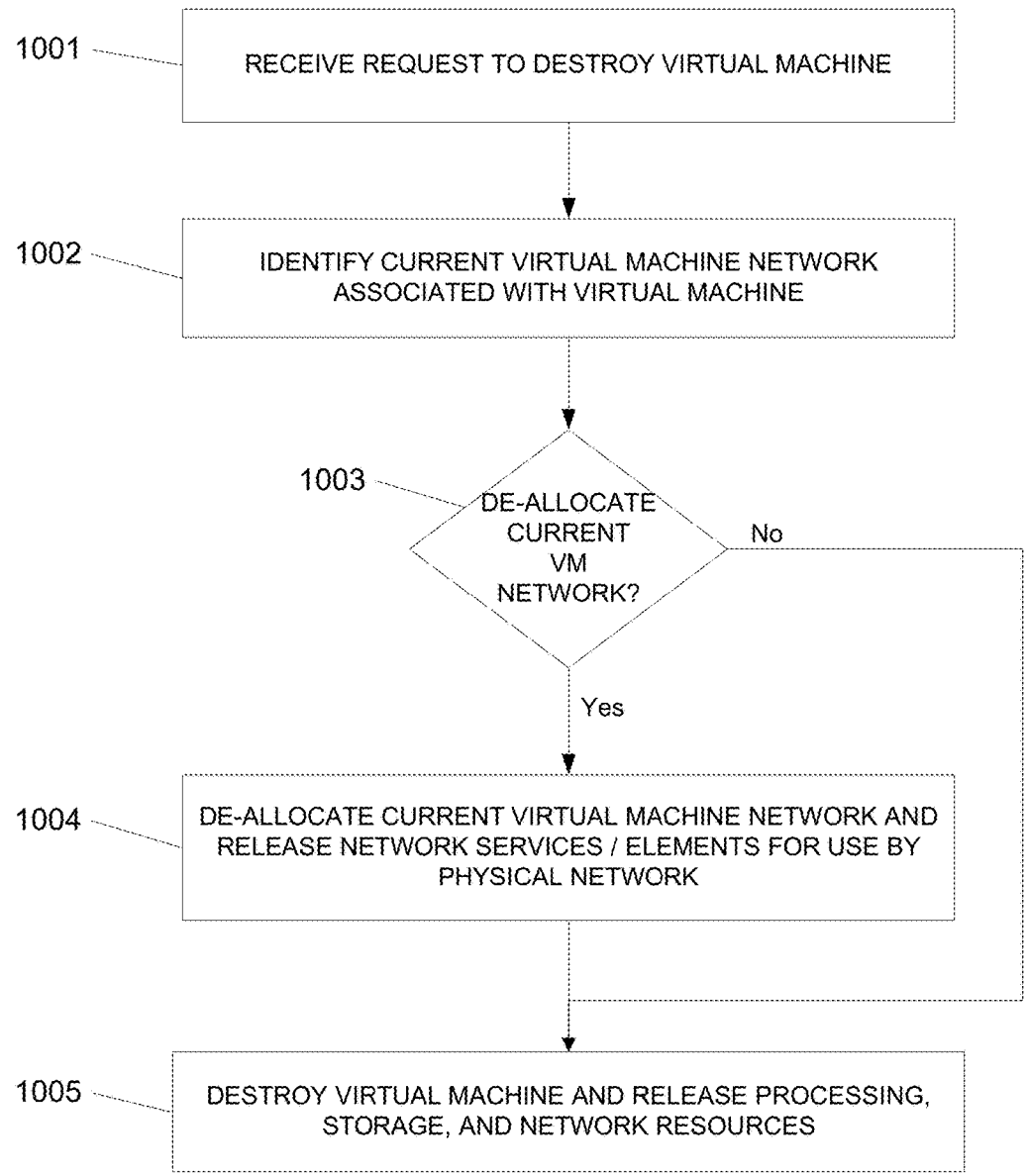

FIG. 10 is a flow diagram illustrating an example process of destroying a virtual machine in a cloud computing environment, in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems including a virtualization environment which may be useful for practicing embodiments described herein; and Section C describes embodiments of systems and methods relating to network offerings in cloud computing environments.

A. Network and Computing Environment

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330*a*-330*n*. In some embodiments, the local system bus 350 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 300 include an I/O device 330*a*-330*n* that includes a video display 224 that communicates with the central processing unit 321. Still other versions of the computing machine 300 include a processor 321 connected to an I/O device 330*a*-330*n* via any one of the following connections: HyperTransport, Rapid I/O, or InfiniBand. Further embodiments of the computing machine 300 include a processor 321 that communicates with one I/O device 330*a* using a local interconnect bus and a second I/O device 330*b* using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCMCIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230*a*-230*n*: a keyboard 226; a pointing device 227; mice; trackpads; an optical pen;

trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, or cloud system, including at least one virtualization server 106 configured to provide virtual machines and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

B. Systems Including Virtualization Environments

Illustrated in FIG. 4 is one embodiment of a computer device 401 configured as a virtualization server in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can executed, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program that executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks; physical processors; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may executes a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may presents at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

C. Network Offerings in Cloud Computing Environments

FIG. 5 illustrates an example of a cloud computing environment (or cloud system). As seen in FIG. 5, client computers 511-514 may communicate with a cloud management server 510 to access the computing resources (e.g., host servers 503, storage resources 504, and network resources 505) of the cloud system.

Management server 510 may be implemented on one or more physical servers. The management server 510 may run, for example, CLOUDSTACK by Citrix Systems, Inc. of Ft. Lauderdale, Fla., or OPENSTACK, among others. Management server 510 may manage various computing resources, including cloud hardware and software resources, for example, host computers 503, data storage devices 504, and networking devices 505. The cloud hardware and software resources may include private and/or public components. For example, a cloud may be configured as a private cloud to be used by one or more particular customers or client computers 511-514 and/or over a private network. In other embodiments, public clouds or hybrid public-private clouds may be used by other customers over an open or hybrid networks.

Management server 510 may be configured to provide user interfaces through which cloud operators and cloud customers may interact with the cloud system. For example, the management server 510 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 510 also may include a set of APIs and/or one or more customer console applications with user interfaces configured to receive cloud computing requests from end users via client computers 511-514, for example, requests to create, modify, or destroy virtual machines within the cloud. Client computers 511-514 may connect to management server 510 via the Internet or other communication network, and may request access to one or more of the computing resources managed by management server 510. In response to client requests, the management server 510 may include a resource manager configured to select and provision physical resources in the hardware layer of the cloud system based on the client requests. For example, the management server 510 and additional components of the cloud system may be configured to provision, create, and manage virtual machines and their operating environments (e.g., hypervisors, storage resources, services offered by the network elements, etc.) for customers at client computers 511-514, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 511-514 may be related, for example, different client computers creating virtual machines on behalf of the same end user, or different users affiliated with the same company or organization. In other examples, certain clients 511-514 may be unrelated, such as users affiliated with different companies or organizations. For unrelated clients, information on the virtual machines or storage of any one user may be hidden from other users.

Referring now to the physical hardware layer of a cloud computing environment, availability zones 501-502 (or zones) may refer to a collocated set of physical computing resources. Zones may be geographically separated from other zones in the overall cloud of computing resources. For example, zone 501 may be a first cloud datacenter located in California, and zone 502 may be a second cloud datacenter located in Florida. Management sever 510 may be located at one of the availability zones, or at a separate location. Each zone may include an internal network that interfaces with devices that are outside of the zone, such as the management server 510, through a gateway. End users of the cloud (e.g., clients 511-514) might or might not be aware of the distinctions between zones. For example, an end user may request the creation of a virtual machine having a specified amount of memory, processing power, and network capabilities. The management server 510 may respond to the user's request and may allocate the resources to create the virtual machine without the user knowing whether the virtual machine was created using resources from zone 501 or zone 502. In other examples, the cloud system may allow end users to request that virtual machines (or other cloud resources) are allocated in a specific zone or on specific resources 503-505 within a zone.

In this example, each zone 501-502 may include an arrangement of various physical hardware components (or computing resources) 503-505, for example, physical hosting resources (or processing resources), physical network resources, physical storage resources, switches, and additional hardware resources that may be used to provide cloud computing services to customers. The physical hosting resources in a cloud zone 501-502 may include one or more computer servers 503, such as the virtualization servers 410 described above, which may be configured to create and host virtual machine instances. The physical network resources in a cloud zone 501 or 502 may include one or more network elements 505 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, domain name system (DNS) servers, static NAT devices, elastic load balancers (ELBs), and the like. The storage resources in the cloud zone 501-502 may include storage disks (e.g., solid state drives (SSDs), magnetic hard disks, etc.) and other storage devices.

The example cloud computing environment shown in FIG. 5 also may include a virtualization layer (e.g., as shown in FIGS. 1-4) with additional hardware and/or software resources configured to create and manage virtual machines and provide other services to customers using the physical resources in the cloud. The virtualization layer may include hypervisors, as described above in FIG. 4, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 503 with the physical computing resources.

FIG. 6 shows a flowchart of an illustrative method for defining network offerings in a cloud computing environment, and associating the network offerings with virtual machine networks, physical networks, and/or network elements 505 within the cloud of physical resources. As used herein, a physical network may refer to a set of physical network elements and wiring installed in an availability zone (e.g., zone 501 or 502) of a cloud computing environment. Network elements 505 (or network service providers) may refer to the physical components that provide various network services to virtual machines within the cloud. Examples of network elements that may be installed in zone 501 or 502 include routers, firewall appliances, network address translators, load balancers, VPN gateways, and DHCP routers, among others. Each network element may perform network services for virtual machines started in the same availability zone 501 or 502. There may be different network elements in a zone configured to provide the same network service. For example, zone 501 may include a Cisco router and a Juniper router, each of which is capable of providing a firewall service for the virtual machines in the zone. Additionally, certain network elements may provide multiple instances of a network services, so that a single network element may be used by multiple different physical networks.

In step 601, a cloud operator (or cloud administrator) may define one or more network offerings that may be available to cloud clients 511-514 for virtual machines and other resources created in the cloud computing environment. A network offering refers to a set (or bundle) of network services available to a virtual machine. Network offerings may include not only the type of network services provided (e.g., routing, firewall, network address translation, load balancing, VPN, DHCP, DNS, etc.), but also may specify the quality of the network service to be provided (e.g., the speed, capacity, or specific features offered by the network element, etc.), and the specific model, type, name, and/or manufacturer of the network element that will be providing the service. For example, a function provided by the cloud system via an API to create (or define) a new network offering may accept the following function parameters: a DCHP service identifier, a DNS service identifier, a source NAT service identifier, a port forwarding service identifier, a VPN service identifier, a firewall service identifier, a gateway service identifier, and a list of network element names that may provide the services for this network offering.

Referring briefly to FIG. 7, illustrative user interface 700 may be displayed to an end user (e.g., using a client console application) while the end user is requesting the creation of a new virtual machine. In this example, the user has already specified the desired processing and storage capabilities of the virtual machine to be created. In user interface 700, the client console application has provided the end user with a list of network offerings 705-710 that may be selected for the new virtual machine. Network offering 705 corresponds to a virtual network with a 1G network speed, a Cisco firewall, and other specific gateway, load balancer, and port forwarding network elements (not shown). Network offering 710 corresponds to a shared network with a 10G network speed, a Juniper firewall, and different specific gateway, load balancer, and port forwarding elements (not shown).

A cloud operator may create (or define) a set of network offerings in step 601 by using a cloud operator console application and/or APIs provided by the cloud system (e.g., via management server 510). The system may allow the cloud operator to name the network offering, and select the set of network services to be bundled together for the network offering. The cloud operator may only identify network services for the offering (e.g., firewall service, port forwarding service, etc.), or may identify the specific network elements (i.e., physical network hardware) that will provide those services (e.g., a Juniper gateway model xxx, a Cisco port forwarding switch model xxx, etc.). After the cloud operator defines the network offering, the cloud system may save the definition of the network offering in the management server 510, and may assign an initial operational state to the network offering (e.g., disabled, enabled, active, inactive). In certain examples, all network offerings may be initially created in a disabled state, and may be enabled only after the network services and/or network elements are separately added to the network offering. Additionally, network offerings may be created for system use only, so that they will not be visible to end users as options when creating virtual networks.

In step 602, the cloud operator may create one or more physical networks in an availability zone. As noted above, a physical network refers to a set of network elements (i.e., physical network hardware resources) in a cloud availability zone. Availability zones may be configured with multiple physical networks. For example, in zone 501 of FIG. 5, network elements A and B (among others) may be included in a first physical network, while network elements C and D (among others) may be included in a second physical network. APIs and/or console applications may be provided by the cloud system (e.g., a management server 510) to allow cloud operators to define (or create) physical networks within availability zones. When creating a physical network, a cloud operator may select the zone, and then may specify the list of network elements 505 that will be assigned to the physical network. The cloud operator also may define a set of properties for the physical network, including, for example, the function of the physical network (e.g., storage, guest, management, or public), a level of isolation to be used on the physical network, and the speed of the physical network. The properties may be set creating the physical network or afterward on an existing physical network. A VLAN and VLAN range also may be added to the physical network. During the creation of a physical network, the physical network may be given a unique name that can be used by the hypervisor to find the physical network.

Physical networks may be assigned an operational state by the cloud system (e.g., enabled or disabled). In certain examples, all physical networks may be created in a disabled state, and may be enabled by the cloud operator after confirming that the necessary set of network elements has been added to the physical network to provide the services specified for the physical network.

Cloud operators may also update and delete physical networks in zones. When updating a physical network a cloud operator may first identify the physical network to be updated, and then may add or remove network elements from the list of network elements assigned to the physical network. Physical networks also may be updated by changing the state (e.g., enabled or disabled), the speed (e.g., 1G or 10G), the isolation level, or other properties of the physical network. When a physical network is deleted, the network elements associated with the physical network may be de-allocated and freed up for other uses within the availability zone. As described below, virtual machine networks (i.e., conceptualizations of a physical network that one or more virtual machines can access) may be added to and removed from physical networks. In certain examples, a physical network cannot be deleted until all of the virtual machine networks on the physical network have been de-allocated.

In step 603, the cloud operator may add one or more network elements to the physical networks. As discussed above, a network element 505 (or network service provider) refers to a physical network resource comprising hardware and/or software that may be configured to provide a network service to end users 511-514 in a cloud computing environment. The cloud system may maintain a list of the network elements that are physically installed and operational in each zone, for example, in an XML file in the management server 510 or other persistent storage. To add a network element to a physical network, the cloud system may provide APIs and/or console applications that allows cloud operators to identify a physical network, select a specific network element 505a, and add the network element to the physical network. Thus, the functions of creating a physical network and adding network elements to the physical network need not change the physical wiring of any of the computing resources 503-505 in a zone 501, but instead may refer to the logic assignment of network elements 505 within the zone. After this assignment, the network element 505a may be used to provide network services only to virtual machines within its assigned physical network, and may not be used by virtual machines within other physical networks in the same zone 501.

When adding a network elements 505 to a physical network, the cloud system may assign an operational state to the network element (e.g., enabled or disabled). In certain examples, the cloud system by default may add network elements in a disabled state, and may require each network element to be separately enabled. When enabling a network element 505a, the cloud system may configure the element (using the APIs of the element) for the physical network, and may confirm before enabling the element that it is fully configured to provide network services to virtual machines within that physical network. Certain network elements 505 may support multiple instances of the same type of network element on the same physical network. In this example, each of the separate instances may be configured through the APIs of the network element 505.

Cloud operators also may use the APIs and/or console applications provided by the cloud system to enable or disable network elements on a physical network, and to remove elements from a physical network.

In step 604, the cloud operator may create one or more virtual machine networks within the physical network. In this context, a virtual machine network may refer to a conceptualization of a physical network that may be configured to be accessed by one or more virtual machines, and does not refer to a physical network comprising physical network elements. The cloud system may provide APIs and/or console applications to allow cloud operators to create and destroy virtual machine networks from the physical networks in an availability zone 501. When a virtual machine network is created, the network may or may not have network resources (i.e., services, instances, or dedicated overhead provided by the network elements) allocated to it from the physical network. In certain examples, virtual machine networks created by the cloud system may initially exist in a conceptual or pre-allocated state. For instance, to conserve the network resources within the physical network, the cloud system might not allocate certain resources (e.g., a VLAN) to a virtual machine network until a virtual machine is started in that network. Similarly, when the last virtual machine in a virtual machine network is stopped, the cloud system (e.g., management server 510) automatically may de-allocate the resources from the virtual machine network (e.g., using garbage collection techniques), so that the network resources are not tied up in a virtual machine network that does not contain any virtual machines.

Virtual machine networks within a physical network may be dedicated or shared networks. A dedicated virtual machine network is a network that is set up within a physical network for virtual machines associated with a single end user. Dedicated virtual machine networks may use dynamic allocation and garbage collection of resources such as VLANs, so that the network does not consume any physical network resources unless it contains existing virtual machines. In certain examples, a dedicated network may be associated with a single network offering, which may be upgraded or downgraded for the entire dedicated network. A shared virtual machine network may be shared by multiple end users, and may be associated with multiple network offerings. Thus, end users creating a virtual machine within a shared virtual machine network may be able to select one of multiple different network offerings for their virtual machine. Isolation in a shared virtual machine network may be performed using security groups.

In step 605, the cloud operator may associate the network offerings defined in step 601 with the virtual machine networks created in step 604. The cloud system may provide APIs and/or console applications to allow cloud operators to match network offerings to virtual machine networks. Thus, when an end user selects a particular network offering for creating a virtual machine, the cloud system may assure that the new virtual machine will be created within the virtual machine network corresponding to the selected network offering. Tags and various other techniques may be used to associate network offerings with virtual machine networks. A tag may refer to an electronic label or storage data associated with a specific network offering, virtual machine network, network element, physical network, zone, and/or other cloud computing resource. For example, for each network offering provided by a cloud system, the system may store a tag (e.g., data stored a system database or XML file associated with the network offering) to associate the offering with a specific virtual machine network. Similarly, tagging may be used to associate virtual machine networks with physical networks and/or network elements, to assure that the corresponding physical network and the network elements therein will provide the network for the new virtual machine. As an example, each network offering may have a single tag associated with a virtual machine network, each virtual machine network may have a single tag associated with a physical network, and each physical network may have one or more tags associated with the network elements in the zone that are assigned to the physical network. Thus, a network offering selected for a new virtual machine may determine not only the virtual machine network, but also the physical network and network elements within the zone that will be used to provide the network services for the virtual machine.

Referring now to FIGS. 8-10, three flowcharts are shown illustrating example methods of creating a virtual machine (FIG. 8), changing the network offering for an existing virtual machine (FIG. 9), and destroying a virtual machine (FIG. 10) in a cloud computing environment. Each of these example methods may be performed in a cloud system, such as the illustrative cloud system shown in FIG. 5, or other various cloud computing environments. The example methods shown in FIGS. 8-10 may be performed (e.g., by management server 510) after the steps of FIG. 6 have been performed to create and configure the various network offerings, virtual machine networks, network elements, physical networks, and availability zones in the cloud system.

Referring now to FIG. 8, in step 801 a request is received to create a virtual machine in the cloud computing environment. The request may be received from a cloud end user via a client computer 511-514, using APIs and/or an end user console application provided by the cloud system (e.g., by management server 510). In this example, the request to create a new virtual machine may include a selection of a network offering. A user interface, such as the illustrative user interface 700 shown in FIG. 7, may be provided to allow the end user to select a network offering 705-710 for the new virtual machine.

In step 802, after the end user has selected a network offering, the cloud system may identify the virtual machine network associated with the network offering. As discussed above, network offerings may be tagged (e.g., using a tag database, XML files, etc.) and associated with a corresponding virtual machine network, which may be tagged and associated with a corresponding physical network, which may be tagged and associated with its assigned network elements. Thus, based on the selected network offering, the cloud system may use tags to identify the virtual machine network, physical network, and the specific network elements that will be used to provide network services to the new virtual machine.

In step 803, the cloud system may determine whether the virtual machine network has been previously allocated on the physical network. As noted above, virtual machine networks may be created in a conceptual or pre-allocated state, in which the cloud system has not yet allocated network resources (e.g., a VLAN) to the virtual machine network. For example, a cloud system might not allocate a VLAN to a dedicated virtual machine network until a first virtual machine ready to be started in that network, whereas shared virtual machine networks may be automatically allocated when they are created by the cloud system.

If the virtual machine network has not been previously allocated (803: No), then in step 804 the cloud system may allocate the network services for the virtual machine network. Network services are provided by the network elements within the physical network (e.g., routers, firewalls, network address translators, load balancers, VPN gateways, DHCP routers, DNS servers, etc.), and include the execution of functions/services performed by the network elements, the creation of new instances of network services, and the use of dedicated overhead (e.g., storage and processing resources) within the network elements. After allocating a virtual machine network, the cloud system may update the operational state of the virtual machine network to indicate that it is allocated. If the virtual machine network has been previously allocated (803: Yes), then step 804 may be skipped and the new virtual machine may be created on the virtual machine network in step 805. After starting the new virtual machine, the cloud system may update the status of the virtual machine network, the physical network, and/or the network elements to indicate that a virtual machine is running on those networks and using those network services/elements.

Referring now to FIG. 9, in step 901 an end user request is received to change the network offering of an existing virtual machine. As in step 801, described above, the request may be received from a cloud end user via a client computer 511-514, using APIs and/or an end user console application provided by the cloud system (e.g., management server 510). The request to change the network offering of an existing virtual machine may include a selection of a new network offering, for example, by providing a user interface, such as the illustrative user interface 700 shown in FIG. 7, to allow the end user to select a new network offering for the virtual machine In step 902, the cloud system may identify the virtual machine network currently associated with the virtual machine. As discussed above, the cloud system may use tags to identify the virtual machine network, physical network, and the specific network elements that currently provide network services to the virtual machine.

In step 903, the cloud system may determine whether the current virtual machine network should be de-allocated from the physical network and/or the network elements. As discussed above, the cloud system may de-allocate certain virtual machine networks when no virtual machines exist on the network. For example, if the current virtual machine is the only virtual machine remaining on a dedicated network, the cloud system may determine in step 903 that the dedicated virtual machine network should be de-allocated from the physical network (903: Yes). In other examples, if other virtual machines are running on the virtual machine network, or if the network is a shared virtual machine network, the cloud system may determine that the virtual machine network should not be de-allocated from the physical network (903: No). Additionally, in some examples, multiple network offerings may be supported by the same virtual machine network. In such cases, the virtual machine network associated with the selected network offering may be the same as the current virtual machine network for the virtual machine, and thus the virtual machine network should not be de-allocated (903: No) because it will remain as the virtual machine network for the virtual machine. Although these examples may apply for certain cloud systems, the determinations regarding if, when, and how virtual machine networks are allocated and de-allocated may be different in different cloud systems depending on the rules for allocation and de-allocation established by the cloud operator in those systems.

In step 904, if the cloud system has determined that the current virtual machine network should be de-allocated (903: Yes), the cloud system may de-allocate any network services dedicated by the network elements within the physical network (e.g., routers, firewalls, network address translators, load balancers, VPN gateways, DHCP routers, etc.) to the virtual machine network, thereby freeing up those network resources to be used for other virtual machine networks/virtual machines in the zone.

In step 905, the cloud system identifies (e.g., using tags) the virtual machine network associated with the selected new network offering for the virtual machine, and in step 906, the cloud system moves the virtual machine to the new virtual machine network. When moving a virtual machine from one virtual machine network to another, the cloud system may first determine if the new virtual machine network is allocated, and, if not, may allocate the virtual machine network within the physical network as described above in steps 803-0804. The cloud system may then configure network elements in the new virtual machine network to provide network services to the virtual machine. As noted above, in some examples the previous network offering and new network offering may be associated with the same virtual machine network. In such examples, the virtual machine need not be moved between different virtual machine networks in step 906, but the network elements within the physical network still may be potentially re-configured to provide the new network offering to the virtual machine.

Referring now to FIG. 10, in step 1001 an end user request is received to destroy (or stop) an existing virtual machine. As described above, the request may be received from a cloud end user via a client computer 511-514, using APIs and/or an end user console application provided by the cloud system (e.g., by management server 510).

In step 1002, the cloud system may identify the virtual machine network currently associated with the virtual machine. As discussed above, the cloud system may use tags to identify the virtual machine network, physical network, and/or the specific network elements that currently provide network services to the virtual machine.

In step 1003, the cloud system may determine whether the current virtual machine network should be de-allocated from the physical network and/or network elements. As discussed above regarding step 903, the cloud system may implement rules regarding whether the virtual machine network should be de-allocated when the virtual machine is destroyed. In step 1004, if the cloud system has determined that the virtual machine network should be de-allocated (1003: Yes), then the cloud system may de-allocate any network services dedicated by the network elements within the physical network, (e.g., routers, firewalls, network address translators, load balancers, VPN gateways, DHCP routers, etc.) to the virtual machine network, thereby freeing up those network resources to be used for other virtual machine networks/virtual machines in the zone.

In step 1005, the virtual machine may be destroyed and the computing resources designated for the virtual machine, including processing/hosting resources, storage resources, and network resources may be released and de-allocated (e.g., using garbage collection), thereby freeing up the computing resources for existing and future virtual machines in the zone.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:

1. One or more non-transitory computer-readable media storing computer-executable instructions that, when executed by a processor, cause a computing device to:
   receive, from a cloud operator, a selection of a first zone within a cloud of computing resources in which to create a first physical network, wherein the cloud of computing resources comprises a plurality of zones each comprising a respective plurality of collocated network elements;
   receive, from the cloud operator, a selection of a first network element within the first zone to be added to the first physical network;
   create the first physical network in the first zone based on the selection of the first zone and the selection of the first network element, wherein the first physical network includes the first network element and does not include at least one other network element in the plurality of network elements in the first zone;
   receive, from the cloud operator, an indication that the first physical network is associated with a first virtual machine network corresponding to a first network offering comprising a set of network services;
   receive, from an end user, a request to create a first virtual machine within the cloud of computing resources, wherein the request identifies the first network offering;
   retrieve a first tag corresponding to the first network offering, wherein the first tag identifies the first virtual machine network as corresponding to the first network offering;
   determine, based on the first tag and a second tag associated with the first virtual machine network, that the first physical network corresponds to the first virtual machine network; and
   based on determining that the first physical network corresponds to the first virtual machine network, create the requested first virtual machine on the first physical network within the first zone.

2. The computer-readable media of claim 1, wherein a hypervisor in the cloud of computing resources uses an identifier of the first physical network to access the first network element.

3. The computer-readable media of claim 1, storing further computer-executable instructions that, when executed by the processor, cause the computing device to:
   identify a second network element within the first zone to be added to the first physical network; and
   upgrade the first physical network to include the second network element.

4. The computer-readable media of claim 3, wherein the first network element and the second network element provide the same network service.

5. The computer-readable media of claim 4, wherein at least one network offering of the first physical network is associated with the first network element, and wherein at least one different network offering of the first physical network is associated with the second network element.

6. The computer-readable media of claim 1, wherein the first zone is configured with a plurality of physical networks.

7. The computer-readable media of claim 1, wherein the instructions, when executed by the processor, further cause the computing device to:
   receive a set of properties for the first physical network, wherein creating the first physical network in the first zone is based on the set of properties.

8. The computer-readable media of claim 7, wherein the set of properties for the first physical network comprises a level of isolation for the first physical network.

9. The computer-readable media of claim 7, wherein the set of properties for the first physical network comprises a speed for the first physical network.

10. The computer-readable media of claim 1, storing further computer-executable instructions that, when executed by the processor, cause the computing device to:
    receive an end user request to destroy the first virtual machine;
    determine, in response to the end user request to destroy the first virtual machine, whether the first physical network includes any other virtual machines; and
    when determining that the first physical network does not include any other virtual machines, de-allocate network elements from the plurality of collocated network elements corresponding to the first physical network.

11. A method, comprising:
    receiving, by a cloud management server and from a cloud operator, a selection of a first zone within a cloud of computing resources in which to create a first physical network, wherein the cloud of computing resource comprises a plurality of zones each comprising a respective plurality of collocated network elements;

receiving, by the cloud management server and from the cloud operator, a selection of a first network element within the first zone to be added to the first physical network;

creating, by the cloud management server, the first physical network in the first zone based on the selection of the first zone and the selection of the first network element, wherein the first physical network includes the first network element and does not include at least one other network element in the plurality of network elements in the first zone;

receiving, by the cloud management server and from the cloud operator, an indication that the first physical network is associated with a first virtual machine network corresponding to a first network offering comprising a set of network services;

receiving, by the cloud management server and from an end user, a request to create a first virtual machine within the cloud of computing resources, wherein the request identifies the first network offering;

retrieving, by the cloud management server, a first tag corresponding to the first network offering, wherein the first tag identifies the first virtual machine network as corresponding to the first network offering;

determining, by the cloud management server and based on the first tag and a second tag associated with the first virtual machine network, that the first physical network corresponds to the first virtual machine network; and based on determining that the first physical network corresponds to the first virtual machine network, creating the requested first virtual machine on the first physical network within the first zone.

12. The method of claim 11, further comprising:
identifying, by the cloud management server, a second network element within the first zone to be added to the first physical network; and
upgrading, by the cloud management server, the first physical network to include the second network element.

13. The method of claim 12, wherein the first network element and the second network element provide the same network service.

14. The method of claim 13, wherein at least one network offering of the first physical network is associated with the first network element, and wherein at least one different network offering of the first physical network is associated with the second network element.

15. The method of claim 11, wherein the first zone is configured with a plurality of physical networks.

16. The method of claim 11, further comprising:
receiving an end user request to destroy the first virtual machine;
determining, in response to the end user request to destroy the first virtual machine, whether the first physical network includes any other virtual machines; and
when determining that the first physical network does not include any other virtual machines, de-allocating network elements from the plurality of collocated network elements corresponding to the first physical network.

17. A cloud management server, comprising:
one or more processors; and
memory storing instructions that, when executed by the one or more processors, causes the cloud management server to:
receive, from a cloud operator, a selection of a first zone within a cloud of computing resources in which to create a first physical network, wherein the cloud of computing resources comprises a plurality of zones each comprising a respective plurality of collocated network elements;
receive, from the cloud operator, a selection of a first network element within the first zone to be added to the first physical network;
create the first physical network in the first zone based on the selection of the first zone and the selection of the first network element, wherein the first physical network includes the first network element and does not include at least one other network element in the plurality of network elements in the first zone;
receive, from the cloud operator, an indication that the first physical network is associated with a first virtual machine network corresponding to a first network offering comprising a set of network services;
receive, from an end user, a request to create a first virtual machine within the cloud of computing resources, wherein the request identifies the first network offering;
retrieve a first tag corresponding to the first network offering, wherein the first tag identifies the first virtual machine network as corresponding to the first network offering;
determine, based on the first tag and a second tag associated with the first virtual machine network, that the first physical network corresponds to the first virtual machine network; and
based on determining that the first physical network corresponds to the first virtual machine network, create the first virtual machine on the first physical network within the first zone.

18. The cloud management server of claim 17, wherein the memory stores further instructions that, when executed by the one or more processors, cause the cloud management server to:
receive an end user request to destroy the first virtual machine;
determine, in response to the end user request to destroy the first virtual machine, whether the first physical network includes any other virtual machines; and
when determining that the first physical network does not include any other virtual machines, de-allocate network elements from the plurality of collocated network elements corresponding to the first physical network.

* * * * *